May 16, 1933. D. R. LESSLER 1,908,907
COMBINED GEAR SHIFT AND PARKING BRAKE OPERATING DEVICE
Filed Nov. 16, 1931
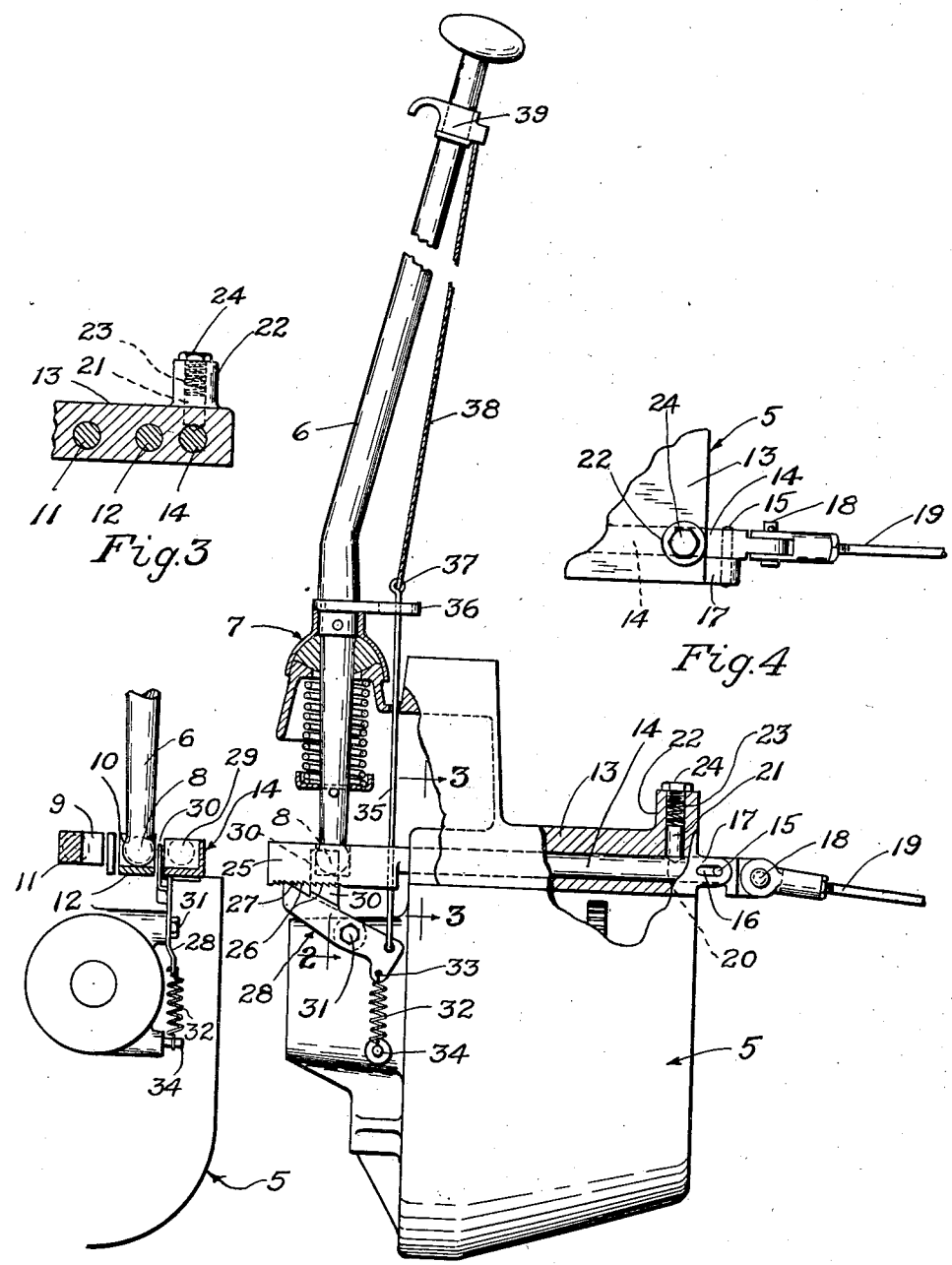
Inventor
David R. Lessler
By Wooster & Davis
Attorneys Patented May 16, 1933

1,908,907

UNITED STATES PATENT OFFICE

DAVID R. LESSLER, OF BRIDGEPORT, CONNECTICUT

COMBINED GEAR SHIFT AND PARKING BRAKE OPERATING DEVICE

Application filed November 16, 1931. Serial No. 575,215.

This invention relates to new and useful improvements in automobile control mechanism and has particular relation to a combined gear shift and parking brake operating device.

An object of the invention is to provide an arrangement whereby the gear shift lever may be used to operate the parking brake of an automobile whereby the ordinary parking brake lever is dispensed with.

Another object is to provide an arrangement as stated and which is so constructed that the brake will not be accidentally applied in the operation of shifting gears.

A further object is to provide a device as stated and which is so constructed that when the parking brake has been set the gear shift lever cannot be operated to place the automobile in gear until the brake has been released whereby the automobile may not be started with the parking brake set, and burning out of the brake bands from that cause will be prevented.

Other objects and advantages will become apparent from a consideration of the following detailed description taken in connection with the accompanying drawing wherein a satisfactory embodiment of the invention is shown. It will of course be understood that the invention is not limited to the details disclosed but includes all such variations and modifications as fall within the spirit of the invention and the scope of the appended claims.

In the drawing:

Fig. 1 is a view partly in side elevation and partly in section showing the application of the invention in its relation to a conventional transmission;

Fig. 2 is a detail view looking from the left in Fig. 1, parts being shown in section;

Fig. 3 is a detail sectional view substantially on the line 3—3 of Fig. 1; and

Fig. 4 is a detail showing in top plan the connection between a rod or slide and a link to the brakes and showing the means for frictionally securing the parts in position with the parking brake released.

Referring in detail to the drawing at 5 is shown a transmission case of any or the usual kind and with which is associated a gear shifting lever 6 having a ball socket mounting at 7 whereby the lever may be operated to shift gears in the usual manner. Usually the lever 6 is arranged substantially vertically and at its lower end is rounded or formed into a ball 8 adapted to be selectively engaged in the recess 9 and 10 of the rods or slides 11 and 12 whereby to shift gears. The rods 11 and 12 as here shown form parts of the usual transmission mechanisms and are slidably mounted in the thickened upper wall 13 of the case 5. In the standard gear shift rod 11 ordinarily shifts the gears for the low and reverse speeds while rod 12 controls the gears for second and high speed positions, but of course, as far as my improved brake operating device is concerned this arrangement may be varied as desired.

As above suggested according to the present invention the gear shift lever 6 is used to set the parking brake and to this end it is advisable that the lever be somewhat heavier than usual. Mounted for sliding movement in the thickened upper wall or portion 13 of the transmission case 5 is a third rod or slide 14 which may be described as the brake setting rod. Rod 14 is shown as arranged and in substantially parallel relation with respect to the rods 11 and 12 and is also shown as extending through the portion 13 of the transmission case and extending beyond each end thereof, although this arrangement may be varied as desirable with different types and arrangements of transmissions.

While the rod 14 might be made square or of other angular cross-sectional configuration it is preferred that its portion through the transmission case be round, and to prevent casual turning of the rod it is adjacent its rear end provided with a pin 15 operating in an elongated opening 16 in an ear or extension 17 integral with or carried by the case 5. Obviously this pin and slot arrangement will not prevent sliding movement of the rod 14 but will prevent turning movement thereof and the reason for maintaining the rod against turning movement will later appear.

The rear end portion of the rod 14 is pivotally connected as by a pin 18 with one end portion of a rod or link means 19 connected to operate the brake or brakes (not shown) which may be any of the usual types. The arrangement is such that on the rod 14 being slid forwardly from the position shown in Fig. 1, the link 19 will be drawn forwardly and the parking brake set. In its upper portion adjacent its rear end the rod 14 is provided with a notch 20 adapted to be entered by a spring pressed plunger 21 arranged in a housing 22, the spring 23 for moving the plunger being confined within the housing between the plunger and a screw plug 24. This arrangement is such that when the parking brake is released, which is the position shown in the drawing, the plunger 21 enters the notch 20 to frictionally hold the rod 14 against casual movement. However, the engagement between the plunger and rod is such that the rod may be operated by the lever 6 to apply or set the parking brake, the plunger in this movement being forced upwardly into the housing 22 against the action of spring 23.

The forward end portion of the rod 14 projects beyond the upper wall 13 of the casing 5 as before described, and for the purpose of clarity in the description this forward portion of the rod has been designated 25. Although this end portion is shown as projecting from the casing, it will of course, be obvious it may be enclosed in the casing depending on which is the preferred arrangement and also depending on the location of the gear shift lever. The portion 25 of the rod may be rectangular in cross section and this portion in its lower edge is provided with a series of notches or teeth 26 adapted as will later more fully appear to be engaged by the toothed end 27 of a dog 28 whereby to hold the rod in its forward position with the parking brake set.

Also in its forward end portion 25, the rod is provided with a recess 29, the said recess 29 of the rod 14 corresponding with the recesses 9 and 10 of the rods 11 and 12 and being adapted to receive the lower ball shaped end 8 of the gear shift lever 6 when the parts are being arranged to be used in the setting of the parking brake. This recess 29 is in lateral alignment with the recesses 9 and 10 when the gear shift lever is in the neutral position and the brake is released. The lever 6 is manipulated as usual to operate the rods or slides 11 and 12 and selectively engage the gears of the transmission. However, when it is desired to set the parking brake, lever 6 is operated from the neutral position after lifting of finger grip 39 to dispose its end 8 in the notch 29 of the rod 14 and the lever is then drawn rearwardly whereby its lower portion moves forwardly to draw the rod 14 forwardly and apply the brake. The end portion 27 of the dog 28 will engage in one of the notches or teeth 26 in the lower edge of the head or forward portion 25 of rod 24 and maintain the brake set. As turning movement of the rod is prevented the teeth 26 will always be disposed to be engaged by the tooth 27 of the dog.

Means are provided whereby it will be impossible to accidentally shift lever 6 in such manner as to dispose its lower end 8 in the notch 29 of rod 14. Therefore, any possibility of the brake being accidentally applied when the operator merely intends to shift gears is eliminated. This means comprises a guard lug 30 formed with or carried by the dog 28 and so located that in its normal position it blocks the entrance to the recess 29 as clearly shown in Figs. 1 and 2. Means are provided for moving or shifting the lug from its normal position whereby the lower end 8 of the lever 6 may enter the recess 29, although this shifting of the guard requires a positive action on the part of the operator and will not likely be accidentally performed.

The dog 28 is pivotally mounted on a portion of the transmission case as at 31 and a spring 32 has one end connected to the dog as at 33 and has its other end anchored as at 34 and this spring constantly urges the dog about its pivot 31 in to its normal position as shown in Figs. 1 and 2 wherein the guard 30 is also in its normal position blocking entrance to the recess 29. A rod or other element 35 is also connected with the dog 28 and this rod extends upwardly through a guide 36 and at its upper end is connected as at 37 with the lower end of a second rod or flexible element as a cable 38 in turn connected at its upper end with a movable finger piece 39 arranged on the upper portion of the lever 6 so as to be within convenient reach of a person occupying the driver's seat.

In the operation of the combined gear shift and parking brake operating device the lever 6 is manipulated as usual in the shifting of gears and as already explained is prevented from accidentally being shifted into a position for operation to set the parking brake. When it is desired to set the parking brake the gear shift lever 6 is placed in neutral position and the finger piece 39 is raised to rock the dog about its pivot 31 and against the action of spring 32 whereby to move the guard 30 away from the entrance to the recess 29. Lever 6 may then be tilted or rocked on its ball and socket mounting to dispose its end 8 in the recess 29 of the rod 14 after which the upper portion of the lever may be drawn rearwardly to set the brake as will be understood.

After the brake has been set and the finger piece 39 is released the spring 32 will act to rock the dog and return the same to its normal position with the guard lug 30 across the entrance to the recess 29. Thus the lever will be locked in its brake operating position and when it is desired to again start the car or automobile the operator must manipulate the finger piece 39 to shift the dog 28 to carry the guard lug 30 out of the way before the lever may be released from the rod 14 and returned to its neutral position from which it may be moved to shift gears. This manipulation of the finger piece will carry the tooth 27 of the dog 28 away from the notches 26 of the bar 14 and the bar will move rearwardly releasing the brake.

Therefore, it will be seen that there is little if any possibility of the operator attempting to start the car, as by cranking, with the car in gear. Usually, when a car is being cranked the parking brake is set and it sometimes happens that a car is cranked in gear with serious results in so far as the person standing in front of the car and cranking it is concerned. With the present arrangement when the parking brake is applied the car cannot possibly be in gear since when the car is in gear the lever 6 must first be operated to place the car in neutral before the lever may be used to apply the brake. Therefore, if the parking brake has been applied the car will not be started and run into or over a person cranking the car. Further, since after the engine of the automobile is started the automobile cannot be placed in gear except by releasing the parking brake and operating the lever 6, it will be seen that the car may not be driven with the parking brake set and burning out of the brake bands from this cause will be prevented.

Having thus set forth the nature of my invention, what I claim is:

1. In combination with an automobile transmission, a gear shift lever mounted on the transmission extending upwardly therefrom and provided with a hand grip at its upper end, said lever being movable between a neutral and a plurality of other positions, a means connected with the automobile parking brake, and said lever shiftable into a position whereby movement of the lever will be transmitted to said means to operate the parking brake.

2. In combination with an automobile transmission, a gear shift lever mounted on the transmission extending upwardly therefrom and provided with a hand grip at its upper end, said lever being movable between a neutral and a plurality of other positions, a means connected with the automobile parking brake, said lever shiftable into a position whereby movement of the lever will be transmitted to said means to operate the parking brake, and means preventing accidental shifting of the lever into said position wherein movement of the lever will be transmitted to said means.

3. In combination with an automobile transmission, a gear shift lever mounted on the transmission extending upwardly therefrom and provided with a hand grip at its upper end, said lever being movable between a neutral and a plurality of other positions, a slidable rod connected with the automobile parking brake, said lever shiftable into a position wherein movement of the lever will be transmitted to said slidable rod to operate the parking brake, and means preventing accidental shifting of the lever into said position wherein movement of the lever will be transmitted to said means.

4. In combination with an automobile transmission, a gear shift lever mounted on the transmission extending upwardly therefrom and provided with a hand grip at its upper end, said lever being movable between a neutral and a plurality of other positions, a means connected with the automobile parking brake, said lever shiftable into a position wherein movement of the lever will be transmitted to said means to operate the parking brake and manually shiftable means preventing accidental shifting of the lever into said position wherein movement of the lever will be transmitted to said means.

5. In combination with an automobile transmission, a gear shift lever movable between a neutral and a plurality of other positions, a slidable rod connected with the automobile parking brake, said lever shiftable into a position wherein movement of the lever will be transmitted to said slidable rod to operate the parking brake, and shiftable means preventing accidental shifting of the lever into said position wherein movement of the lever will be transmitted to said means.

6. In combination with an automobile transmission, a gear shift lever movable between a neutral and a plurality of other positions, a slidable rod, means connecting said rod with the automobile parking brake, and said rod having a recess to receive a portion of said lever when the lever is in one of its positions whereby the lever may be used to slide said rod and apply the parking brake.

7. In combination with an automobile transmission, a gear shift lever movable between a neutral and a plurality of other positions, a slidable rod, means connecting said rod with the automobile parking brake, said rod having a recess to receive a portion of said lever in one of its positions whereby the lever may be used to slide said rod and apply the parking brake, and means preventing accidental shifting of the lever into the position wherein a portion of the lever enters the recess in said slidable rod.

8. In combination with an automobile transmission, a gear shift lever movable between a neutral and a plurality of other positions, a means connected with the automobile parking brake, said lever shiftable into a position wherein movement of the lever will be transmitted to some means to operate the parking brake, means preventing accidental shifting of the lever into said position wherein movement of the lever will be transmitted to said means, and said means preventing accidental shifting of the lever adapted to prevent accidental movement of the lever out of said position wherein movement of the lever will be transmitted to the parking brake.

9. In combination with an automobile transmission, a gear shift lever movable between a neutral and a plurality of other positions, a slidably mounted rod, a connection between said rod and the automobile parking brake, said rod having a recess to receive the lower end portion of the lever when the lever is in one of its positions whereby the lever may be operated to set the parking brake, a movably mounted guard normally disposed to prevent movement of the lower end portion of the lever into the recess in the rod, and means controllable from the upper portion of the lever for moving said guard from its normal position to permit of movement of the lower portion of the lever into said recess.

10. In combination with an automobile transmission, a gear shift lever movable between a neutral and a plurality of other positions, a slidably mounted rod, a connection between said rod and the automobile parking brake, said rod having a recess to receive the lower end portion of the lever when the lever is in one of its positions whereby the lever may be operated to set the parking brake, a movably mounted guard adapted to prevent movement of the lower portion of the lever out of the recess in the rod after said portion has been moved into said recess, and means controllable from the upper portion of the lever for moving said guard to permit movement of the lower portion of the lever out of the recess.

11. In combination with an automobile transmission, a gear shift lever movable between a neutral and a plurality of other positions, a rod slidably mounted by the transmission housing, a connection between said rod and the automobile parking brake, said rod having a recess to receive the lower end portion of the lever when the lever is in one of its positions whereby the lever may be operated to set the parking brake, a movably mounted guard normally disposed to close the entrance to said recess to prevent movement of the lower end portion of the lever into the recess, and means controllable from the driver's seat of the automobile for actuating said guard from its normal position to permit of movement of the lower portion of the lever into the recess.

12. In combination with an automobile transmission, a gear shift lever movable between a neutral and a plurality of other positions, a rod slidably mounted by the transmission housing, means preventing turning movement of the rod in its mounting, a connection between the rod and the automobile parking brake, said rod having a recess to receive the lower end portion of the lever when the lever is in one of its positions whereby the lever may be operated to set the parking brake, a shiftable guard normally disposed to close the entrance to the recess to prevent movement of the lower end portion of the lever into the recess, and means controllable from the driver's seat of the automobile for actuating said guard from its normal position to permit of movement of the lower portion of the lever into the recess.

13. In combination with an automobile transmission, a gear shift lever movable between a neutral and a plurality of other positions, a rod slidably mounted by the transmission housing, a connection between said rod and the automobile parking brake, said rod having a recess to receive the lower end portion of the lever when the lever is in one of its positions whereby the lever may be operated to set the parking brake, and means frictionally engaging said rod to yieldingly retain it in position with the parking brake released.

14. In combination with an automobile transmission, a gear shift lever movable between a neutral and a plurality of other positions, a slidably mounted rod, a connection between said rod and the automobile parking brake, said rod having a recess to receive a portion of the lever when the lever is in one of its positions whereby the lever may be operated to set the parking brake, a pivotally mounted guard normally disposed to prevent movement of said portion of the lever into the recess in the rod, a finger piece of the upper portion of the lever, and a connection between said finger piece and the guard whereby the finger piece may be operated to move the guard on its pivot away from normal position.

15. In combination with an automobile transmission, a gear shift lever movable between a neutral and a plurality of other positions, a slidably mounted rod, a connection between said rod and the automobile parking brake, said rod having a recess to receive a portion of the lever when the lever is in one of its positions whereby the lever may be operated to set the parking brake, said rod having a series of teeth, a pivotally mounted dog, means normally urging said dog into a position to engage one of said teeth and retain the rod in position with the parking brake set, and means for operating said dog to release the rod.

16. In combination with an automobile transmission, a gear shift lever removable between a neutral and a plurality of other positions, a slidably mounted rod, a connection between said rod and the automobile parking brake, said rod having a recess to receive the lower end portion of the lever when the lever is in one of its positions whereby the lever may be operated to slide the rod and set the parking brake, said rod having a series of teeth, a pivotally mounted dog adapted in its normal position to engage one of the teeth on the rod whereby the dog is adapted to hold the rod in position with the parking brake set, a guard lug carried by the dog and in the normal position of the dog occupying a position to prevent movement of the lower end of the lever into the recess, and means controllable from a remote point for operating the dog to shift it from its normal position.

17. In combination with an automobile transmission, a gear shift lever movable between a neutral and a plurality of other positions, a slidably mounted rod, a connection between said rod and the automobile parking brake, said rod having a recess to receive the lower end portion of the lever when the lever is in one of its positions whereby the lever may be operated to slide the rod and set the parking brake, said rod having a series of teeth, a pivotally mounted dog adapted in its normal position to engage one of the teeth on the rod whereby the dog is adapted to hold the rod in position with the parking brake set, a guard carried by the dog and in the normal position of the dog occupying a position to prevent movement of the lower end of the lever into the recess, a spring urging the dog to normal position, a finger piece on the upper portion of the lever, and a connection between said finger piece and the dog whereby the dog may be shifted from normal position.

In testimony whereof I affix my signature.

DAVID R. LESSLER.